United States Patent
Ohnishi et al.

(10) Patent No.: US 7,193,707 B2
(45) Date of Patent: Mar. 20, 2007

(54) SMALL SIZED WIDE WAVE-RANGE SPECTROSCOPE

(75) Inventors: Akira Ohnishi, Tokyo (JP); Sumitaka Tachikawa, Atsugi (JP); Shozo Katsuki, Ube (JP); Koji Masutani, Tokyo (JP)

(73) Assignee: Ube Industries, Ltd., Yamaguchi (JP)

( * ) Notice: Subject to any disclaimer, the term of this patent is extended or adjusted under 35 U.S.C. 154(b) by 144 days.

(21) Appl. No.: 11/048,211

(22) Filed: Feb. 1, 2005

(65) Prior Publication Data

US 2005/0168738 A1 Aug. 4, 2005

(30) Foreign Application Priority Data

Feb. 2, 2004 (JP) ............... 2004-025621

(51) Int. Cl.
*G01J 3/28* (2006.01)
*G01J 3/18* (2006.01)
(52) U.S. Cl. ................................... 356/328
(58) Field of Classification Search ............. 356/305, 356/326, 328, 334
See application file for complete search history.

(56) References Cited

U.S. PATENT DOCUMENTS

| | | | |
|---|---|---|---|
| 2,453,164 A | 11/1948 | Swings | |
| 3,015,984 A * | 1/1962 | Martin | ........................ 356/334 |
| 3,791,737 A * | 2/1974 | Johansson | .................... 356/328 |
| 4,264,205 A | 4/1981 | Landa | |
| 4,678,332 A | 7/1987 | Rock et al. | |
| 5,973,780 A * | 10/1999 | Tsuboi et al. | ............... 356/328 |

FOREIGN PATENT DOCUMENTS

| | | |
|---|---|---|
| JP | 59-180440 | 10/1984 |
| JP | 6-109538 | 4/1994 |
| JP | 06-331446 | 12/1994 |
| JP | 9-145477 | * 6/1997 |

\* cited by examiner

*Primary Examiner*—F. L. Evans
(74) *Attorney, Agent, or Firm*—Knobbe Martens Oloson & Bear, LLP

(57) ABSTRACT

The present invention provides a small sized wide wave-range spectroscope with a simple structure which requires a short time to measure light for measurement over a wide wavelength spectrum. The small sized wide wave-range spectroscope has a collimator (43) for changing light for measurement (L) transmitted through a slit (41) into collimated light (L0), a plurality of diffraction gratings (44*a*, 44*b*) with different grating constants d supported rotatably around a rotational axis in parallel with the incident slit (41) and disposed side by side in the direction of the rotational axis in the optical path of the collimated light (L0), and a diffracted-light focusing members (45*a*, 45*b*) for focusing a plurality of diffracted light rays (L1 to L4) provided by the plurality of diffraction gratings (44*a*, 44*b*) by which the collimated light (L0) is diffracted, each of the diffracted-light focusing members (45*a*, 45*b*) being provided in association with each of the plurality of diffraction gratings (44*a*, 44*b*).

8 Claims, 3 Drawing Sheets

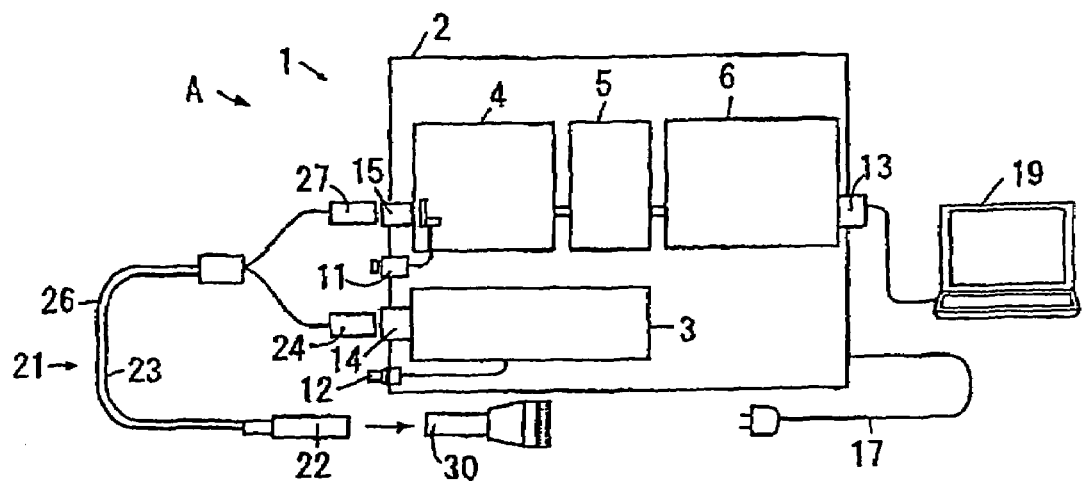
FIG. 1
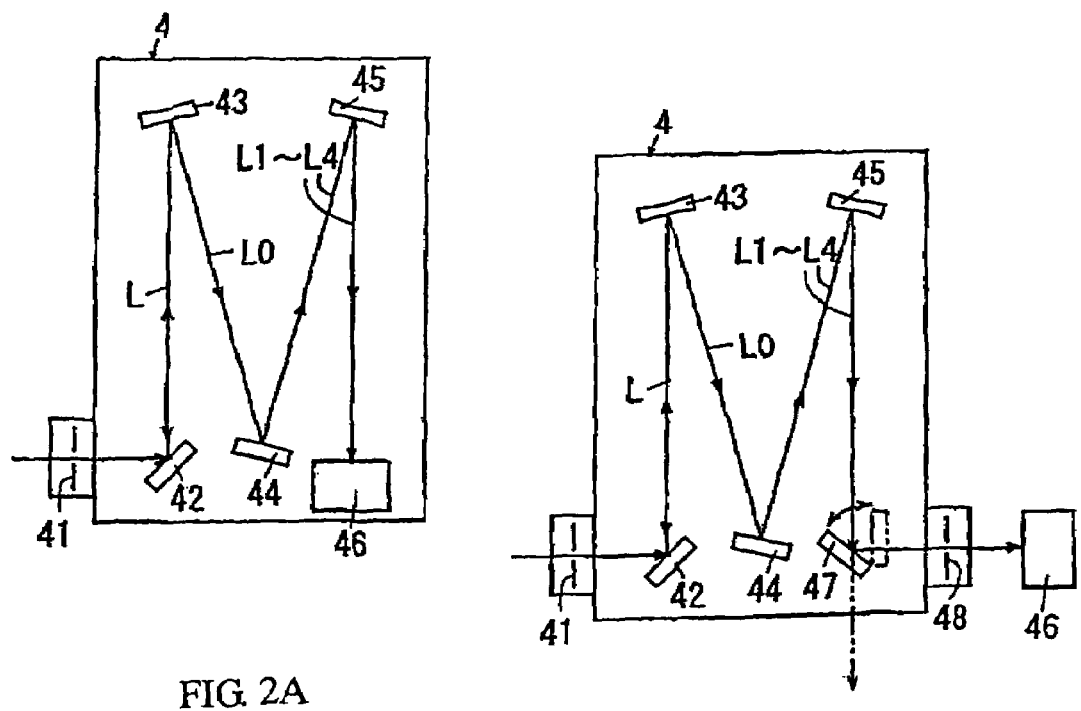
FIG. 2A
FIG. 2B

CONFIGURATION OF SPECTROSCOPE OPTICAL SYSTEM AND ITS SCANNING WAVELENGTH RANGE (MEASURED WAVELENGTH RANGE OF WAVELENGTH SPECTRUM)

| DIFFRACTION GRATING (44) | | Order of Diffraction | LIGHT AMOUNT DETECTOR (D1~D4) | Transmission Wavelength Range of Filters (F1 to F4) | OUTPUT WAVELENGTH of SPECTROSCOPE OPTICAL SYSTEM (nm) |
|---|---|---|---|---|---|
| 44a | (1200 grooves/mm) (750 nm-Blaze) | 1 | D1 (Si) | F1 (550~) | (500) ~ 550 ~ 600 ~ 700 ~ 800 ~ 900 ~ 1,000 ~ 1,100 ~ (1,200) ~ (1,300) |
| | (1200 grooves/mm) (750 nm-Blaze) | 2 | D2 (Si) | F2 (250~600) | 250 ~ 300 ~ 350 ~ 400 ~ 450 ~ 500 ~ 550 ~ 600 ~ (650) |
| 44b | (600 grooves/mm) (1250 nm-Blaze) | 1 | D3 (InGaAs) (~2,600) *1 | F3 (1,400~) | (1,000) ~ (1,200) ~ 1,400 ~ 1,600 ~ 1,800 ~ 2,000 ~ 2,200 ~ 2,400 ~ 2,600 |
| | (600 grooves/mm) (1250 nm-Blaze) | 2 | D4 (InGaAs) (~1,700) | F4 (900~) | 1,000 ~ 1,200 ~ 1,400 ~ 1,600 ~ 1,700 ~ (1,800) ~ (2,000) ~ (2,200) ~ (2,400) ~ (2,600) |

\*1: One-Stage Electronic Cooling

FIG. 4

SMALL SIZED WIDE WAVE-RANGE SPECTROSCOPE

BACKGROUND OF THE INVENTION

1. Field of the Invention

The present invention relates to a spectroscope for measuring the wavelength distribution (wavelength spectrum of light) of light to be measured (light for measurement) such as light reflected by a sample or light transmitted through a sample to conduct an analysis of the sample.

2. Description of the Background Art

In a conventional spectroscope, light for measurement is transmitted through a slit, changed into collimated light (parallel rays) by a collimator such as a mirror or a lens for collimation, and then incident on a rotatably supported diffraction grating. The collimated light is diffracted by the diffraction grating. The light diffracted by the diffraction grating has a diffraction angle depending on the wavelength thereof. Thus, when a diffracted-light focusing member such as a lens or a mirror is disposed in the path of diffracted light having a certain wavelength, the diffracted light with this wavelength is focused to a predetermined focus position. However, the diffracted light with a different wavelength is not focused to the same focus position when the diffraction grating remains motionless. On the other hand, when the diffraction grating is rotated, diffracted light with a different wavelength is sequentially focused to the same focus position.

Since the wavelength of diffracted light focused to the focus position is determined by the rotational angle of the diffraction grating, the detection of the light amount distribution based on the wavelength of the diffracted light (wavelength spectrum of light for measurement) is carried out by placing a slit and a light amount detector for detecting the amount of focused light at the focusing point, and detecting the amount of received light by the light amount detector while the diffraction grating is rotated.

When the light amount detector disposed at the focus position has a very small light-receiving area, the slit at the focus position may be omitted.

Since the diffraction grating has diffraction efficiency depending on wavelength, it is necessary to use a plurality of diffraction gratings with different grating constants and different blazes in order to make measurements over a wide range of wavelengths. The diffraction grating diffracts light rays with wavelengths of different orders at the same diffraction angle. Thus, the light rays with wavelengths of different orders needs to be separated by using an appropriate filter.

The light amount detector disposed at the focus position of the diffracted light has varying sensitivity to wavelengths of incident light or has no sensitivity to some wavelengths. A light amount detector having excellent sensitivity to light with a real wavelength may not be able to sensitively detect light with different wavelength far from the wavelength at maximum sensitivity.

To detect the wavelength spectrum of the light for measurement over a wide range of wavelengths with high sensitivity, it is necessary to dispose a plurality of light amount detectors having different wavelength sensitivity at a plurality of focus positions of diffracted light rays with separate wavelengths such that the light rays with different wavelengths can be sensitively detected.

The wavelength spectrum of the light can be detected sensitively over a wide range of wavelengths by using the plurality of focus positions for the light diffracted by the diffraction grating and disposing the light amount detectors with different wavelength sensitivity characteristics at the plurality of focus positions, respectively.

To use the plurality of focus positions for the light diffracted by the diffraction grating, however, it is necessary to dispose diffracted-light focusing members such as lenses or mirrors in the paths of the diffracted light with different wavelengths sent from the diffraction grating so as to focus the diffracted light with the plurality of wavelengths at the plurality of focus positions, respectively. The arrangement of filters and light amount detectors at the plurality of focus positions allows the detection of the wavelength spectrum of the light over the wide range of wavelengths with excellent sensitivity. However, in that case, the plurality of diffracted-light focusing members are required, and the size of whole apparatus may be increased or higher cost is needed.

According to a different type of conventional method, a wide wavelength spectrum of light is measured as follows.

For example, three diffracting gratings with different grating constants consisting of a visual light diffraction grating, an infrared diffraction grating and an ultra-violet diffraction grating are attached to three sides of a triangular prism rotatable around an axis, respectively. The triangular prism is rotated so that the respective diffraction gratings attached to the sides thereof are positioned sequentially to measurement positions (incident positions of collimated light for measurement). Then, while the diffracting gratings positioned at the measurement positions are rotated, diffracted light is focused on a focus position by a diffracted-light focusing member disposed in the optical path of the diffracted light sent from the diffraction grating. A filter or a light amount detector disposed at the focus position is replaced according to the type of the three diffraction gratings. The filter or the light amount detector appropriate for the employed diffraction grating is used to measure the wavelength spectrum of the focused diffracted light.

In this method of measuring the wavelength spectrum, the three diffraction gratings with different grating constants need to be rotated sequentially to the measurement positions (the incident positions of the collimated light for measurement) for making measurements. In addition, since the filter or the light amount detector disposed at the focus position must be replaced in accordance with a wavelength range to be measured, it takes a long time to measure the wavelength spectrum of the light for measurement.

SUMMARY OF THE INVENTION

In view of the above-mentioned problems, we made intensive investigation to provide a compact spectroscope for wide-range use with a simple structure which realizes a shorter measurement time for measuring over a wide wavelength spectrum. We reached the following conclusions.

(1) A plurality of diffraction gratings with different grating constants "d" supported rotatably around a vertical rotational axis are advantageously disposed side by side in the direction of the rotational axis in the path of collimated light for measurement, and diffracted-light focusing members are disposed in association with the respective diffraction gratings. By this construction, a plurality of diffracted light rays diffracted by the plurality of diffraction gratings is easily focused to a plurality of focus positions.

(2) By placing filters with different transmission wavelength ranges and light amount detectors with different wavelength sensitivity characteristics at the plurality of focus positions, detection of the wavelength spectrum of the light for measurement over a wide range of wavelengths with excellent sensitivity can be attained, while an increased number of diffracted-light focusing members can be prevented.

Accordingly, an object of the present invention is to provide a small sized wide wave-range spectroscope with a simple structure which requires a short time to measure light for measurement over a wide wavelength spectrum.

Next, the present invention is described. To facilitate the understandings of the relation between elements in the present invention and elements in Example, later described, reference numerals and symbols of the elements in Example are added in parentheses. However, this is by no means intended to limit the scope of the present invention to Example.

(First Aspect of the Invention)

According to the first aspect of the invention, there is provided a small sized wide wave-range spectroscope comprising:

(A01) a collimator (43) for changing light for measurement (L) passed through an incident slit (41) into collimated light (L0);

(A02) a plurality of diffraction gratings (44a, 44b) with different diffraction constants d supported rotatably around a rotational axis in parallel with the incident slit (41) and disposed side by side in the direction of the rotational axis in the optical path of the collimated light (L0); and (A03) diffracted-light focusing members (45a, 45b) for focusing a plurality of diffracted light rays (L1 to L4) provided by the plurality of diffraction gratings (44a, 44b) by which the collimated light (L0) is diffracted, each of the diffracted-light focusing members (45a, 45b) being provided in association with each of the plurality of diffraction gratings (44a, 44b).

(Second Aspect of the Invention)

According to the second aspect of the invention, there is provided a small sized wide wave-range spectroscope comprising:

(A01) a collimator (43) for changing light for measurement (L) passed through an incident slit (41) into collimated light (L0);

(A05) a diffraction grating (44a or 44b) supported rotatably around a rotational axis in parallel with the incident slit (41) and disposed in the optical path of the collimated light (L0);

(A06) a diffracted-light focusing member (45a or 45b) for focusing a plurality of diffracted light rays (L1, L2 or L3, L4) on a plurality of different focus positions, respectively, wherein the diffracted light rays are diffracted by the diffraction grating (44a or 44b) and incident on the same diffracted-light focusing member (45a or 45b) at a plurality of different positions; and (A07) a plurality of filters (F1, F2 or F3, F4) with different transmission wavelength ranges disposed at the focus positions of the plurality of diffracted light rays (L1, L2 or L3, L4); and light amount detectors (D1, D2 or D3, D4) for detecting the amounts of light transmitted through the plurality of filters (F1, F2 or F3, F4), respectively.

In the second aspect of the invention, a slit may be disposed at the focus position. Especially when the light amount detector having a large light-receiving area is used, the slit needs to be provided.

According to the present invention, there is provided a small sized wide wave-range spectroscope with a simple structure which requires only a short time to measure the wavelength spectrum of light for measurement.

BRIEF DESCRIPTION OF THE DRAWINGS

FIG. 1 is an explanatory drawing showing Example 1 of a spectroscope equipped with a small sized wide wave-range spectroscope according to the present invention;

FIG. 2 includes explanatory drawings of the small sized wide wave-range spectroscope shown in FIG. 1, and specifically, FIG. 2A is a schematic plan view showing the small sized wide wave-range spectroscope of Example 1, and FIG. 2B shows a modification of the wide wavelength small spectroscope of Example 1 shown in FIG. 2A;

FIG. 4 is a chart showing the details of upper and lower diffraction gratings 44a and 44b, light amount detectors D1 to D4, and filters F1 to F4 shown in FIG. 3.

Figure 3:
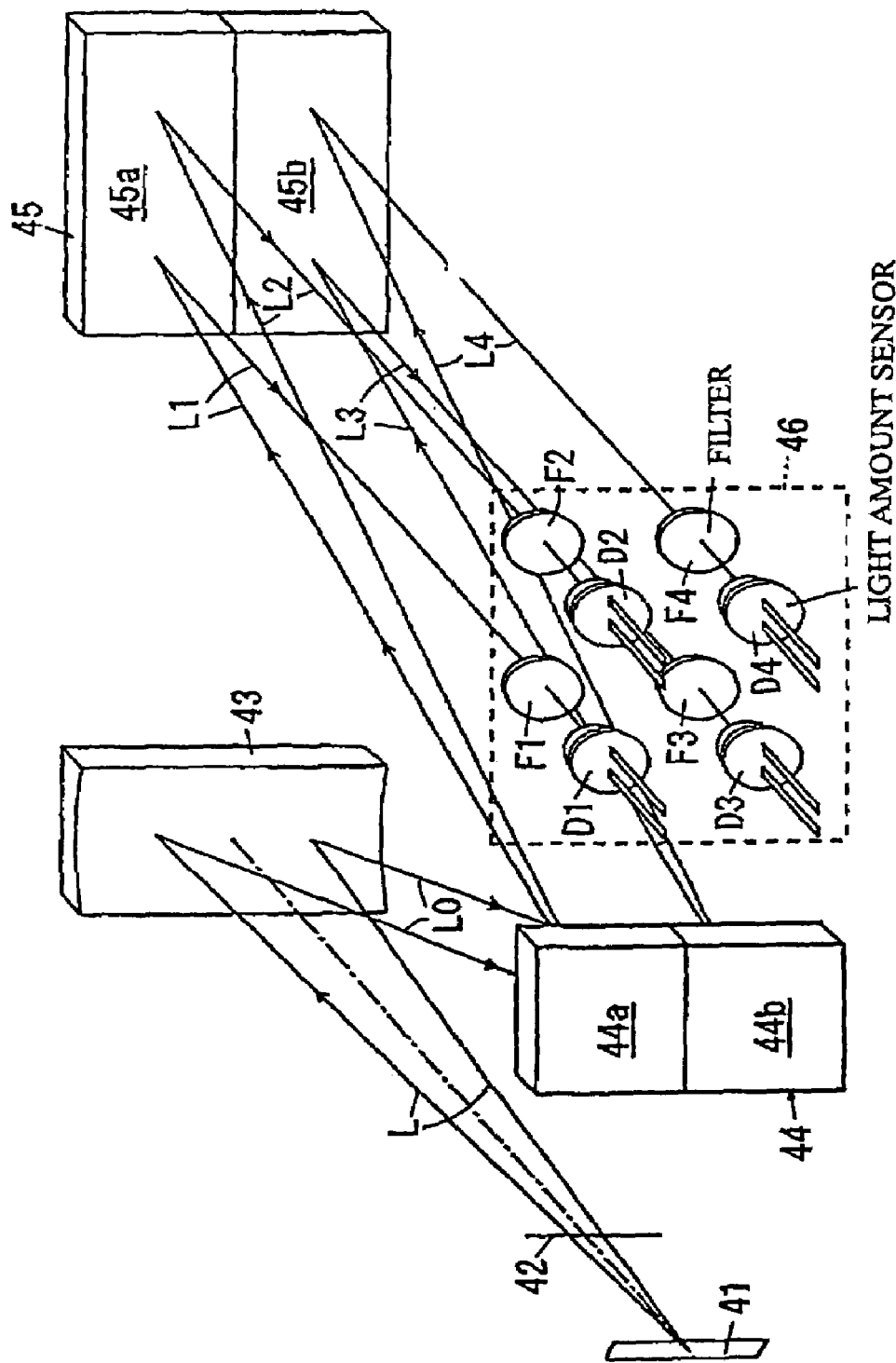
FIG. 3 is a schematic perspective view showing the small sized wide wave-range spectroscope of Example 1 shown in FIG. 2A.

DETAILED DESCRIPTION OF THE INVENTION (Description of the First Aspect of the Invention)

In the small sized wide wave-range spectroscope of the first aspect of the invention having the abovementioned constituent features (A01) to (A03), the collimator (43) changes the light for measurement (L) passed through the incident slit (41) into the collimated light (L0).

The plurality of diffraction gratings (44a, 44b) having different diffraction constants "d" are supported rotatably around the rotational axis in parallel with the incident slit (41) and are disposed side by side in the direction of the rotational axis in the optical path of the collimated light (L0).

The collimated light (L0) is diffracted into the plurality of diffracted light rays (L1 to L4) by the plurality of diffraction gratings (44a, 44b) with different diffraction constants "d". The diffracted light rays are then focused by the diffracted-light focusing members (45a, 45b) provided in association with the plurality of diffraction gratings (44a, 44b).

Light amount detectors (D1 to D4) with different wavelength range characteristics are disposed at positions to which the plurality of diffracted light rays (L1 to L4) are focused by the plurality of diffracted-light focusing members (45a, 45b), so that the light amounts of the diffracted light rays (L1 to L4) which have the plurality of wavelength ranges can be detected through a single scan of the diffraction gratings (44a, 44b).

Therefore, the wavelength spectrum of the light for measurement (L) over a wide range of wavelengths can be measured through a single scan of the diffraction gratings (44a, 44b).

According to an embodiment of the first aspect of the invention, the spectroscope may further comprise:

(A04) a plurality of filters (F1 to F4) with different transmission wavelength ranges disposed at the focus positions of the plurality of diffracted light rays (L1 to L4), respectively; and light amount detectors (D1 to D4) for detecting the amounts of light transmitted through the plurality of filters (F1 to F4), respectively.

In the small sized wide wave-range spectroscope (4) according to the above specific embodiment of the first aspect of the Invention having the abovementioned constituent feature (A04), the plurality of filters (F1 to F4) with different transmission wavelength ranges and the light amount detectors (D1 to D4) are disposed at the focus positions of the plurality of diffracted light rays (L1 to L4).

The light amount detectors (D1 to D4) detect the amounts of light with wavelengths transmitted through the filters (F1 to F4). Thus, the amounts of the plurality of diffracted light rays (L1, L4) with different wave ranges can be detected through a single scan of the diffraction gratings (44a, 44b).

Therefore, the wide wavelength spectrum of the light for measurement (L) can be measured through a single scan of the diffraction gratings (44a, 44b).

(Description of the Second Aspect of the Invention)

In the small sized wide wave-range spectroscope of second aspect of the invention having the abovementioned constituent features (A01) and (A05) to (A07), the collimator (43) changes the light for measurement (L) passed through the incident slit (41) into the collimated light (L0). The diffraction grating (44a or 44b) supported rotatably around the rotational axis in parallel with the incident slit (41) is disposed in the optical path of the collimated light (L0).

The single diffracted-light focusing member (45a or 45b) focuses the plurality of diffracted light rays (L1, L2 or L3, L4) on the plurality of different focus positions, respectively, where the diffracted light rays are diffracted by the diffraction grating (44a or 44b) and incident on the same diffracted-light focusing member (45a or 45b) at the plurality of different positions.

Since the transmission wavelength range of the filter (F1, F3) disposed at one of the focus positions to which the single diffracted-light focusing member (45a or 45b) focuses the diffracted light rays (L1, L2 or L3, L4)) is different from that of the filter (F2, F4) disposed at another one of the focus positions, the diffracted light rays (L1, L2 or L3, L4) transmitted through the respective filters have different wavelength ranges in their wavelength spectra. Thus, a wavelength spectrum over a wide range of wavelengths can be measured at a time by measuring the wavelength spectra of the diffracted light rays (L1, L2 or L3, L4) transmitted through the respective filters (F1, F2 or F3, F4).

Consequently, it is possible to provide the small sized wide wave-range spectroscope (4) with a simple structure which requires a short time to measure the wavelength spectrum of the light for measurement.

An embodiment of the second aspect of the invention is characterized in that it has constituent feature (A08). That is:

(A08) the plurality of filters (F1, F2), as defined in the second aspect of the invention, comprise a first-order diffracted light transmission filter (F1), for transmitting first-order diffracted light (L1), disposed at one of the plurality of focus positions to which the single diffracted-light focusing member (45a) focuses the diffracted light rays (L1, L2); and a second-order diffracted light transmission filter (F2), for transmitting second-order diffracted light (L2), disposed at another one of the focus positions.

In the small sized wide wave-range spectroscope (4) according to the above specific embodiment of the second aspect of the invention having the abovementioned constituent feature (A04), the first-order diffracted light transmission filter (F1) disposed at one of the plurality of focus positions to which the single diffracted-light focusing member (45a) focuses the diffracted light rays (L1, L2) transmits the first-order diffracted light (L1). The second-order diffracted light transmission filter (F2) disposed at another one of the focus positions transmits the second-order diffracted light (L2).

Thus, at the position of the plurality of different focus positions to which the diffracted light rays (L1, L2) diffracted by the diffraction grating (44a) and incident on the same diffracted-light focusing member (45a) at the plurality of different positions are focused, the wavelength spectrum of the first-order diffracted light (L1) can be measured. At another position, the wavelength spectrum of the second-order diffracted light (L2) can be measured.

The wavelength spectrum of the light for measurement (L) over a wide range of wavelengths can be measured through a single scan of the diffraction grating (44a).

Therefore, it is possible to provide the small sized wide wave-range spectroscope (4) with a simple structure which requires a short time to measure the wavelength spectrum of the light for measurement (L).

EXAMPLE

Next, a specific example (Example 1) of a small sized wide wave-range spectroscope of the present invention is described with reference to the drawings, but the present invention is by no means limited to the following example.

Example 1

FIG. 1 is an explanatory diagram showing Example 1 of a spectroscope equipped with the small sized wide wave-range spectroscope of the present invention.

In FIG. 1, spectroscope A has spectroscope body 1 which has case 2, and light source section 3, small sized wide wave-range spectroscope 4, A/D converter 5, and control section 6 which are contained in case 2. Spectroscope body 1 also has shutter switch 11, light amount adjustment dial 12, SCSI (Small Computer System Interface) connection terminal 13, test light output terminal 14, and measurement light input terminal 15 which are mounted on the outer surface of case 2. Spectroscope body 1 also has power cable 17 for supplying power to the components in case 2.

When spectroscope A is used, computer 19 is removably connected to SCSI terminal 13, and power cable 17 is connected to a receptacle (not shown).

Spectroscope A has probe unit 21 which has probe 22, test light input terminal 24 connected to probe 22 through optical fiber 23, and measurement light output terminal 27 connected to probe 22 through optical fiber 26. Test light input terminal 24 is removably connected to test light output terminal 14, while measurement light output terminal 27 is removably connected to measurement light input terminal 15.

Test light input terminal 24 and measurement light output terminal 27 of probe unit 21 are connected to test light output terminal 14 and measurement light input terminal 15, respectively, to connect probe unit 21 to spectroscope body 1.

While probe unit 21 is connected to spectroscope body 1, test light emitted from light source section 3 is sent from the end of probe 22 through test light output terminal 14, test light input terminal 24, and optical fiber 23. The test light is irradiated to a sample disposed close to the end of probe 22. Light for measurement reflected by the sample is received from the end of probe 22 to small sized wide wave-range spectroscope 4 through optical fiber 26, measurement light output terminal 27, and measurement light input terminal 15.

Reference measurement holder 30 is removably attached to probe 22 and contains a white-light scattering reflector plate. When reference measurement holder 30 is attached to probe 22, the white-light scattering reflector plate is disposed at a position predetermined distance away from the end of probe 22. When the light emitted from light source section 3 is sent from the end of probe 22 through optical fiber 23 while reference measurement holder 30 is attached to probe 22, the light reflected by the white-light scattering reflector plate of reference measurement holder 30 is received by small sized wide wave-range spectroscope 4 from probe 22 through optical fiber 26, measurement light output terminal 27, and measurement light input terminal 15. The detected intensity of the incident light is measured and used as a reference for intensity of light for measurement.

In actual determination of the intensity of diffracted-light of the light reflected by or transmitted through an object under measurement, the detected intensity is divided by the reference intensity and the resultant value is used as the measurement value.

FIG. 2 includes explanatory drawings showing the small sized wide wave-range spectroscope shown in FIG. 1. Specifically, FIG. 2A is a schematic plan view showing the small sized wide wave-range spectroscope of Example 1 and FIG. 2B shows a modified embodiment of the small sized wide wave-range spectroscope of Example 1 shown in FIG. 2A.

In FIGS. 2A and 3, light for measurement L incident from slit 41 is reflected by mirror 42 and incident on collimator (reflecting mirror for collimation) 43. Light for measurement (collimated light) L0 collimated by collimator 43 is incident on diffraction grating section 44. Diffraction grating section 44 is rotatably supported around a rotational axis, which is not shown, in parallel with the longitudinal direction of slit 41. Thus, diffraction grating section 44 is rotatable around the rotational axis, which is not shown. Diffracted lights L1 to L4 diffracted by diffraction grating section 44 are focused by diffracted light focusing section 45 formed of concave mirror and then detected by measurement light detecting section 46.

FIG. 3 is a schematic perspective view showing the small sized wide wave-range spectroscope of Example 1 shown in FIG. 2A. In FIG. 3, diffraction grating section 44 has upper diffraction grating 44a and lower diffraction grating 44b (see FIG. 3) with different grating constants "d" (d=1/N where N represents the number of grooves per millimeter) along the rotational axis. Diffraction gratings 44a and 44b are disposed side by side on the rotational axis in parallel with the longitudinal direction of slit 41.

Diffracted light focusing section 45a has upper diffracted-light focusing member 45a and lower diffracted-light focusing member 45b disposed along the longitudinal direction of slit 41. Each of upper and lower diffracted-light focusing members 45a and 45b is formed of concave mirror.

Measurement light detecting section 46 has four filters F1 to F4 with different transmission wavelength ranges and four light amount detectors D1 to D4 with different wavelength sensitivity characteristics.

In FIG. 3, diffracted light rays L1, L2 diffracted by upper diffraction grating 44a of diffraction grating section 44 are focused by upper diffracted-light focusing member 45a, transmitted through filters F1, F2, and then detected by light amount detectors D1, D2, respectively. Diffracted light rays L3, L4 diffracted by lower diffraction grating 44b of diffraction grating section 44 are focused by lower diffracted-light focusing member 45b, transmitted through filters F3, F4, and then detected by light amount detectors D3, D4, respectively.

Since light amount detectors D1 to D4 used in Example 1 are of small size with a diameter of approximately 1 mm, no slit or aperture is provided immediately before detectors D1 to D4. However, a slit or an aperture may be used as necessary.

FIG. 4 is a chart showing the details of upper and lower diffraction gratings 44a and 44b, light amount detectors D1 to D4, and filters F1 to F4 shown in FIG. 3.

In FIGS. 3 and 4, diffracted light L1 to be transmitted through filter F1 and detected by light amount detector D1 is diffracted by upper diffraction grating 44a and focused by upper diffracted-light focusing member 45a (see FIG. 3).

In FIG. 4, diffraction grating 44a has 1200 grooves per millimeter, and a blaze wavelength of 750 nm (wavelength at the maximum diffraction efficiency of diffraction grating 44a).

Filter F1 has a transmission wavelength range of 550 nm or higher. Si is used for a light amount detecting section of light amount detector D1.

Light amount detector D1 can be used to detect a wavelength spectrum of the first order of diffraction and a detected wavelength range from approximately 600 to 1100 nm.

In FIGS. 3 and 4, diffracted light L2 to be transmitted through filter F2 and detected by light amount detector D2 is diffracted by upper diffraction grating 44a and focused by upper diffracted-light focusing member 45a (see FIG. 3).

In FIG. 4, filter F2 has a transmission wavelength range from 250 to 600 nm, preferably from 300 to 600 nm. Si is used for a light amount detecting section of light amount detector D2.

Light amount detector D2 can be used to detect a wavelength spectrum of the second order of diffraction and a detected wavelength range from 250 to 600 nm, preferably from 300 to 600 nm.

In FIGS. 3 and 4, diffracted light L3 to be transmitted through filter F3 and detected by light amount detector D3 is diffracted by lower diffraction grating 44b and focused by lower diffracted-light focusing member 45b (see FIG. 3).

In FIG. 4, diffraction grating 44b has 650 grooves per millimeter, and a blaze wavelength (wavelength at the maximum diffraction efficiency of diffraction grating 44b) of 1250 nm.

Filter F3 has a transmission wavelength range of 1400 nm or higher. InGaAs is used for a light amount detecting section of light amount detector D3 which is cooled by a one-stage electronic cooling apparatus during use. In this case, the upper limit in the effective detection wavelength range is 2600 nm. Light amount detector D3 can be used to detect a wavelength spectrum of the first order of diffraction and a detected wavelength range from approximately 1400 to 2600 nm.

In FIGS. 3 and 4, diffracted light L4 to be transmitted through filter F4 and detected by light amount detector D4 is diffracted by lower diffraction grating 44b and focused by lower diffracted-light focusing member 45b (see FIG. 3).

Filter F4 has a transmission wavelength range of 900 nm or higher. InGaAs is used for a light amount detecting section of light amount detector D4. In this case, the upper limit in the effective detection wavelength range is 1700 nm.

Light amount detector D4 can be used to detect a wavelength spectrum of the first order of diffraction and a detected wavelength range from approximately 1000 to 1700 nm.

Thus, the detection of a wavelength spectrum from 250 to 2600 nm is possible by only one spectroscope equipped with the light amount detectors D1 to D4.

Explanation of the Function of Example 1

In small sized wide wave-range spectroscope 4 of Example 1 with the aforementioned structure, collimator 43 changes light for measurement L passed through slit 41 into collimated light L0.

The plurality of diffraction gratings 44*a*, 44*b* with different grating constants "d" rotatably supported around the rotational axis in parallel with slit 41 are disposed in the optical path of collimated light L0 side by side in the direction of the rotational axis.

Upper diffracted-light focusing member 45*a* focuses diffracted light rays L1, L2 diffracted by upper diffraction grating 44*a* and incident on upper diffracted-light focusing member 45*a* at different positions to the plurality of different focus positions, respectively.

Lower diffracted-light focusing member 45*b* focuses diffracted light rays L3, L4 diffracted by lower diffraction grating 44*b* and incident on lower diffracted-light focusing member 45*b* at different positions to the plurality of different focus positions, respectively.

Since the transmission wavelength range of filter F1 disposed at one of the focus positions to which upper diffracted-light focusing member 45*a* focuses the diffracted light is different from that of filter F2 disposed at another one of the focus positions, diffracted light rays L1, L2 transmitted through filters F1, F2 have different wavelength ranges in their wavelength spectra. Thus, a wavelength spectrum over a wide range of wavelengths can be measured at a time by measuring the wavelength spectra of diffracted light L1, L2 transmitted through filters F1, F2. One diffraction grating 44*a* and one diffracted-light focusing member 45*a* can be used to measure the wavelength spectra of diffracted light rays L1, L2 transmitted through filters F1, F2 disposed at the two focus positions at a time, thereby allowing the measurement of the wavelength spectrum over a wide range of wavelengths at a time (through a single scan).

Since the transmission wavelength range of filter F3 disposed at one of the focus positions to which lower diffracted-light focusing member 45*b* focuses the diffracted light is different from that of filter F4 disposed at another one of the focus positions, diffracted light rays L3, L4 transmitted through filters F3, F4 have different wavelength ranges in their wavelength spectra. One diffraction grating 44*b* and one diffracted-light focusing member 45*b* can be used to measure the wavelength spectra of diffracted light rays L3, L4 transmitted through filters F3, F4 disposed at the two focus positions at a time, thereby allowing the measurement of a wavelength spectrum over a wide range of wavelengths at a time (through a single scan).

Thus, in Example 1, diffracted-light focusing members 45*a*, 45*b* provided in association with the plurality of diffraction gratings 44*a*, 44*b*, respectively, converge the plurality of diffracted light rays L1 to L4 provided by the plurality of diffraction gratings 44*a*, 44*b* through which collimated light L0 is diffracted.

Light amount detectors D1 to D4 with different wavelength range characteristics are disposed at the positions to which the plurality of diffracted light rays L1 to L4 are focused by the plurality of diffracted-light focusing members 45*a*, 45*b* provided in association with the plurality of diffraction gratings 44*a*, 44*b*, respectively. Thus, the light amounts of diffracted light rays L1 to L4 with the plurality of wavelength ranges can be detected through a single scan of diffraction gratings 44*a*, 44*b*.

Consequently, the wavelength spectrum of the light for measurement over the wide range of wavelengths can be measured through a single scan of diffraction grating section 44. This can reduce the time taken to measure the wavelength spectrum of light for measurement L. In addition, the number of diffraction gratings 44*a*, 44*b* or diffracted-light focusing members 45*a*, 45*b* is smaller than the number of filters F1 to F4 or light amount detectors D1 to D4, and it is not necessary to provide a structure for moving filters F1 to F4 or light amount detectors D1 to D4 sequentially to the focus positions in Example 1, so that small sized wide wave-range spectroscope 4 can be provided with a simple structure.

In addition, first-order diffracted light transmitting filter F1 disposed at one of the focus positions to which upper diffracted-light focusing member 45*a* focuses the diffracted light transmits the first-order diffracted light. Second-order diffracted light transmitting filter F2 disposed at another one of the focus positions transmits second-order diffracted light.

Thus, diffracted light rays L1, L2 diffracted by upper diffraction grating 44*a* of diffraction grating section 44 and incident on upper diffracted-light focusing member 45*a* at the plurality of different positions are focused to the different focus positions. At the position to which diffracted light L1 is focused, the wavelength spectrum of first-order diffracted light can be measured. At the position to which diffracted light L2 is focused, the wavelength spectrum of second-order diffracted light can be measured. In this manner, the wavelength spectrum of the light for measurement over the wide range of wavelengths can be measured through a single scan of the diffraction grating.

Modified Embodiment of Example 1 Shown in FIG. 2B

FIG. 2 includes the explanatory diagrams showing the small sized wide wave-range spectroscope shown in FIG. 1. Specifically, FIG. 2A is the schematic plan view showing the small sized wide wave-range spectroscope of Example 1 and FIG. 2B shows the modification of the small sized wide wave-range spectroscope of Example 1 shown in FIG. 2A.

The modification of the small sized wide wave-range spectroscope of Example 1 shown in FIG. 2B is different from Example 1 described above in the following points, but identical to Example 1 in other points.

In FIG. 2B, diffracted light rays L1 to L4 diffracted by diffraction grating section 44 and focused by diffracted light focusing section 45 are incident on measurement light detecting section 46 through mirror 47 and slit 48. In the modification of Example 1 shown in FIG. 2B, the structures of diffraction grating section 44, diffracted light focusing section 45, and measurement light detecting section 46 are the same as those in Example 1 shown in FIG. 2A. Specifically, diffraction grating section 44 has a plurality of diffraction gratings 44*a*, 44*b*, diffracted light focusing section 45 has diffracted-light focusing members 45*a*, 45*b*, and measurement light detecting section 46 has four filters F1 to F4 and light amount detectors D1 to D4.

Small sized wide wave-range spectroscope 4 of the modification of Example 1 shown in FIG. 2B, however, has mirror 47 and slit 48 provided between diffracted light focusing section 45 and measurement light detecting section 46. Slit 48 is formed of four slits disposed in association with filters F1 to F4 and light amount detectors D1 to D4 of measurement light detecting section 46.

Spectroscope 1 having small sized wide wave-range spectroscope 4 shown in FIG. 2B has light amount detectors D1 to D4 with different wavelength range characteristics at positions to which a plurality of diffracted light rays L1 to L4 are focused by a plurality of diffracted-light focusing members 45*a*, 45*b* provided in association with the plurality of diffraction gratings 44*a*, 44*b*, respectively, so that the light amounts of diffracted light rays L1 to L4 with the plurality of wavelength ranges can be detected through a single scan of diffraction gratings 44a, 44b, similarly to spectroscope 1 of Example 1 shown in FIG. 2A.

Thus, the wavelength spectrum of light for measurement L over the wide range of wavelengths can be measured through a single scan of diffraction grating section 44. This can reduce the time taken to measure the wavelength spectrum of light for measurement L. In addition, the number of diffraction gratings 44a, 44b or diffracted-light focusing members 45a, 45b is smaller than the number of filters F1 to F4 or light amount detectors D1 to D4, and it is not necessary to provide a structure for moving filters F1 to F4 or light amount detectors D1 to D4 sequentially to the focus positions in the modification of Example 1 shown in FIG. 2, so that small sized wide wave-range spectroscope 4 can be provided with a simple structure.

While Example 1 of the present invention have been described, the present invention is not limited to Example 1 described above. Various modifications are possible without departing from the scope of the present invention described in claims. Some examples of modifications of the present invention are as follows.

(1) In the small sized wide wave-range spectroscope of the present invention, both of a blazed diffraction grating and holographic diffraction grating can be used.

(2) The number of the diffraction gratings disposed along the rotational axis can be three or more.

(3) Instead of two diffracted light rays L1, L2 (or L3, L4) diffracted by one diffraction grating 44a (or 44b) and incident on one diffracted-light focusing member 45a (or 45b) at the plurality of different positions and then focused to the different focus positions, it is possible that three or more diffracted light rays are diffracted by one diffraction grating 44a (or 44b), incident on one diffracted-light focusing member 45a (or 45b) at three or more different positions, and then focused to different focus positions.

What is claimed is:

1. A small sized wide wave-range spectroscope comprising:
    a collimator for changing light for measurement passed through an incident slit into collimated light;
    a plurality of diffraction gratings with different diffraction constants d supported rotatably around a rotational axis in parallel with the incident slit and disposed side by side in the direction of the rotational axis in an optical path of the collimated light;
    diffracted-light focusing members for focusing a plurality of diffracted light rays provided by the plurality of diffraction gratings by which the collimated light is diffracted, each of the diffracted-light focusing members being provided in association with each of the plurality of diffraction gratings, and
    a plurality of filters with different transmission wavelength ranges disposed at the focus positions of the plurality of diffracted light rays, respectively, and light amount detectors for detecting the amounts of light rays transmitted through the plurality of filters, respectively.

2. A small sized wide wave-range spectroscope characterized by comprising:
    a collimator for changing light for measurement passed through an incident slit into collimated light;
    a diffraction grating supported rotatably around a rotational axis in parallel with the incident slit and disposed in an optical path of the collimated light;
    a diffracted-light focusing member for focusing a plurality of diffracted light rays on a plurality of different focus positions, respectively, wherein the diffracted light rays are diffracted by the diffraction grating and incident on the same diffracted-light focusing member at a plurality of different positions; and
    a plurality of filters with different transmission wavelength ranges disposed at the focus positions of the plurality of diffracted light and light amount detectors for detecting the amounts of light rays transmitted through the plurality of filters, respectively.

3. A small sized wide wave-range spectroscope according to claim 2, wherein:
    the plurality of filters comprising a first-order diffracted light transmission filter for transmitting first-order diffracted light disposed at one of the plurality of focus positions to which the diffracted-light focusing member focuses the diffracted light, and a second-order diffracted light transmission filter for transmitting second-order diffracted light disposed at another one of the focus positions.

4. A small sized wide wave-range spectroscope comprising:
    a collimator for changing light for measurement passed through an incident slit into collimated light;
    multiple diffraction gratings with different diffraction constants for providing diffracted light rays from the collimated light, said diffraction grantings being rotatable on a rotational axis parallel to the incident slit and disposed side by side in a direction of the rotational axis in an optical path of the collimated light;
    multiple diffracted-light focusing members for focusing the diffracted light rays having different focus potions, the diffracted-light focusing members being disposed corresponding to the respective diffraction gratings,
    multiple filters with different transmission wavelength ranges disposed at the focus positions of the diffracted light rays, respectively, and
    multiple light amount detectors for detecting an amounts of light rays transmitted through the filters, respectively.

5. The small sized wide wave-range spectroscope according to claim 4, wherein the multiple diffraction gratings are constituted by an upper diffraction grating and a lower diffraction grating, and the multiple diffracted-light focusing members are constituted by an upper diffracted-light focusing member and a lower diffracted-light focusing member, wherein the upper diffraction granting and the upper diffracted-light focusing member provide diffracted light rays L1 and L2, and the lower diffraction granting and the lower diffracted-light focusing member provide diffracted light rays L3 and L4.

6. The small sized wide wave-range spectroscope according to claim 5, wherein the filter for diffracted light rays L1 has a transmission wavelength of 550 nm or higher, the filter for diffracted light rays L2 has a transmission wavelength of 250 nm to 600, the filter for diffracted light rays L3 has a transmission wavelength of 1400 nm or higher, and the filter for diffracted light rays L4 has a transmission wavelength of 900 nm or higher.

7. The small sized wide wave-range spectroscope according to claim 6, wherein the detector for diffracted light rays L1 is capable of detecting a wavelength spectrum of the first order of diffraction and a detected wavelength range of approximately 600–1100 nm, the detector for diffracted light rays L2 is capable of detecting a wavelength spectrum of the second order of diffraction and a detected wavelength range of approximately 250–600 nm, the detector for diffracted light rays L3 is capable of detecting a wavelength spectrum of the first order of diffraction and a detected wavelength range of approximately 1400–2600 nm, and the detector for diffracted light rays L4 is capable of detecting a wavelength spectrum of the second order of diffraction and a detected wavelength range of approximately 1000–1700 nm.

8. The small sized wide wave-range spectroscope according to claim 4, further comprising:
a mirror and slits disposed between the multiple diffracted-light focusing members and the filters in optical paths of the diffracted light rays.

* * * * *

UNITED STATES PATENT AND TRADEMARK OFFICE
CERTIFICATE OF CORRECTION

PATENT NO. : 7,193,707 B2  
APPLICATION NO. : 11/048211  
DATED : March 20, 2007  
INVENTOR(S) : Akira Ohnishi et al.

It is certified that error appears in the above-identified patent and that said Letters Patent is hereby corrected as shown below:

On the title page: Item [73] Assignee, add --Soma Optics, Ltd., Tokyo, Japan-- as a second Assignee.

Signed and Sealed this

Eighth Day of July, 2008

JON W. DUDAS  
*Director of the United States Patent and Trademark Office*